(12) United States Patent
Li

(10) Patent No.: US 7,856,184 B2
(45) Date of Patent: Dec. 21, 2010

(54) SYSTEMS AND METHODS FOR ADAPTIVE INTERFERENCE CANCELLATION

(75) Inventor: Guifang Li, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 628 days.

(21) Appl. No.: 11/846,232

(22) Filed: Aug. 28, 2007

(65) Prior Publication Data

US 2008/0175593 A1    Jul. 24, 2008

Related U.S. Application Data

(60) Provisional application No. 60/840,607, filed on Aug. 28, 2006.

(51) Int. Cl.
*H04B 10/00* (2006.01)
*H04B 10/04* (2006.01)

(52) U.S. Cl. ........................ 398/115; 398/119; 398/128; 398/188

(58) Field of Classification Search ......... 398/115–117, 398/119, 128, 130, 203, 188
See application file for complete search history.

(56) References Cited

U.S. PATENT DOCUMENTS

| | | | |
|---|---|---|---|
| 5,319,438 A | * | 6/1994 | Kiasaleh ...................... 398/203 |
| 6,201,632 B1 | * | 3/2001 | Rollins ........................ 359/259 |
| 7,426,350 B1 | * | 9/2008 | Sun et al. ..................... 398/193 |
| 2007/0206962 A1 | * | 9/2007 | Iannelli ....................... 398/188 |
| 2008/0018881 A1 | * | 1/2008 | Hui et al. .................... 356/5.09 |

* cited by examiner

*Primary Examiner*—Dalzid Singh
(74) *Attorney, Agent, or Firm*—Thomas, Kayden, Horstemeyer & Risley, LLP

(57) ABSTRACT

In one embodiment a communications system includes an RF receiver that receives a desired signal and the interference signal, a first phase modulator that receives the desired signal and the interference signal from the RF receiver and generates a resulting optical signal, a second phase modulator that generates a modulated optical signal relative to an inverse interference signal and transmits the modulated optical signal to the first phase modulator, and a detector that receives the resulting optical signal from the first phase modulator and detects the desired signal, wherein the resulting optical signal comprises a modulated optical signal generated by the first phase modulator relative to the desired signal and the interference signal received from the RF receiver and relative to the modulated optical signal received from the second phase modulator.

30 Claims, 5 Drawing Sheets

SYSTEMS AND METHODS FOR ADAPTIVE INTERFERENCE CANCELLATION

CROSS-REFERENCE TO RELATED APPLICATION

This application claims priority to copending U.S. provisional application entitled, "Adaptive Interference Cancellation in Optical Communications" having Ser. No. 60/840,607, filed Aug. 28, 2006, which is entirely incorporated herein by reference.

BACKGROUND

It is currently believed that future military airborne and shipboard communication systems will employ the Joint Tactical Radio System (JTRS), which comprises a family of affordable, high-capacity tactical radios to provide both line-of-sight and beyond line-of-sight Channel 4 International (C4I) capabilities. The radios are expected to cover an operating spectrum of about 2 to 2000 megahertz (MHz), and will be capable of transmitting voice, video, and data communications.

In the anticipated configuration, an aircraft or ship will comprise transmitting and receiving antennas that will transmit and receive radio communications. One example arrangement is depicted in FIG. 1. More particularly, FIG. 1 illustrates a portion of a fiber optic/radio frequency communication system 10 comprising a radio frequency (RF) receiver 12 and an RF transmitter 14. Connected to the RF receiver 12 is a fiber optic (FO) transmitter 16, which is in optical communication with a fiber optic receiver 18 via fiber optic line 20. With such apparatus, RF signals can be received with the RF receiver 12, provided to the FO transmitter 16, and then transmitted to the FO receiver 18 via the fiber optic line 20, which may reside within a control center of the aircraft or ship. In the system 10 of FIG. 1, the FO transmitter 16 and FO receiver 18 are distinct components to permit physical separation.

Often times, the antennas (not shown) of the RF receiver 12 and the RF transmitter 14 are co-located. Even when this is not the case, the antennas may not be physically separated by a great distance. In such cases, strong interfering signals from the transmitting antenna may be received by the receiving antenna and, therefore, may be output by the RF receiver to the fiber optic transmitter and the remainder of the optical portion of the communication system. Given that the transmitted signals are often much stronger than the received signals, it is possible for the received signals to become lost in the data transmitted along the optical portion of the communication system. In other words, the transmitted signal acts as an interfering signal ($S_I$) that can cause reduction of the carrier-to-noise density ($C/N_O$) in the received, or desired, signal ($S_D$). Accordingly, needed is a communications systems similar to that depicted in FIG. 1, in which the interfering signal can be attenuated to enable detection of the desired signal, $S_D$.

BRIEF DESCRIPTION OF THE DRAWINGS

The disclosed systems and methods can be better understood with reference to the following drawings. The components in the drawings are not necessarily to scale.

DETAILED DESCRIPTION

As described above, desired is a communications system, such as in a fiber optic/radio frequency communication system, in which the interfering signals can be attenuated to enable detection of a desired signal. One solution to the interference problem is to use adaptive cancellation for the interfering signals. As described in the following, one attractive solution is optical cancellation scheme that takes advantage of the inherent linearity of optical phase modulation.

Figure 1:
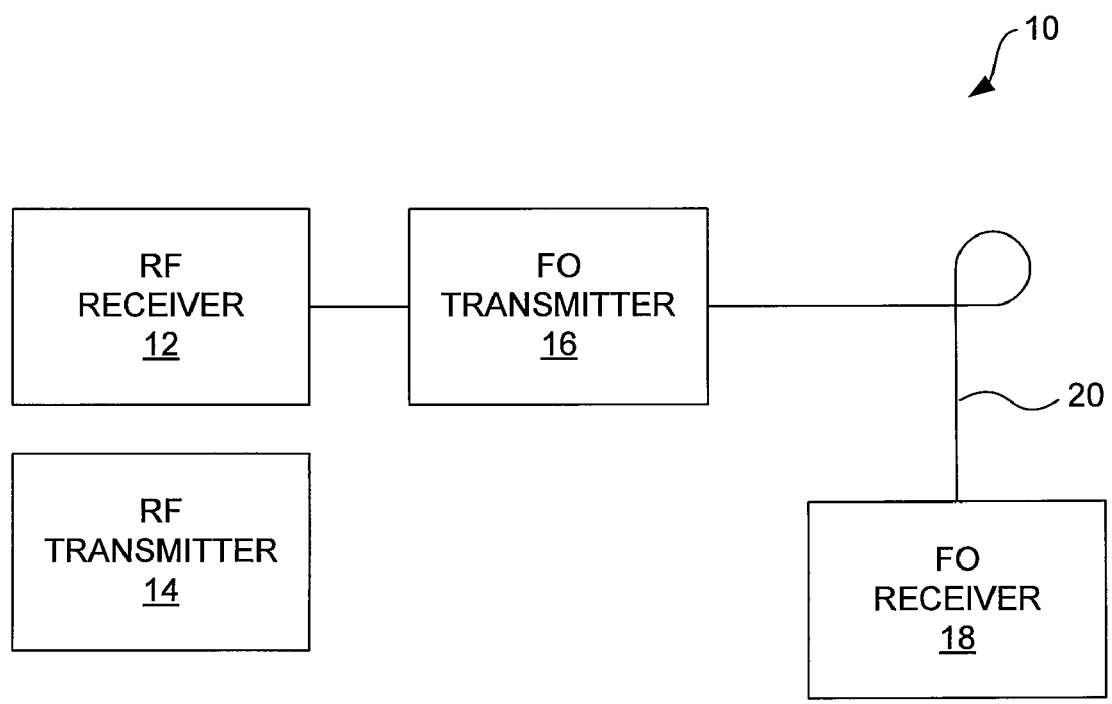
FIG. 1 is a block diagram of an existing communication system.
Figure 2A:
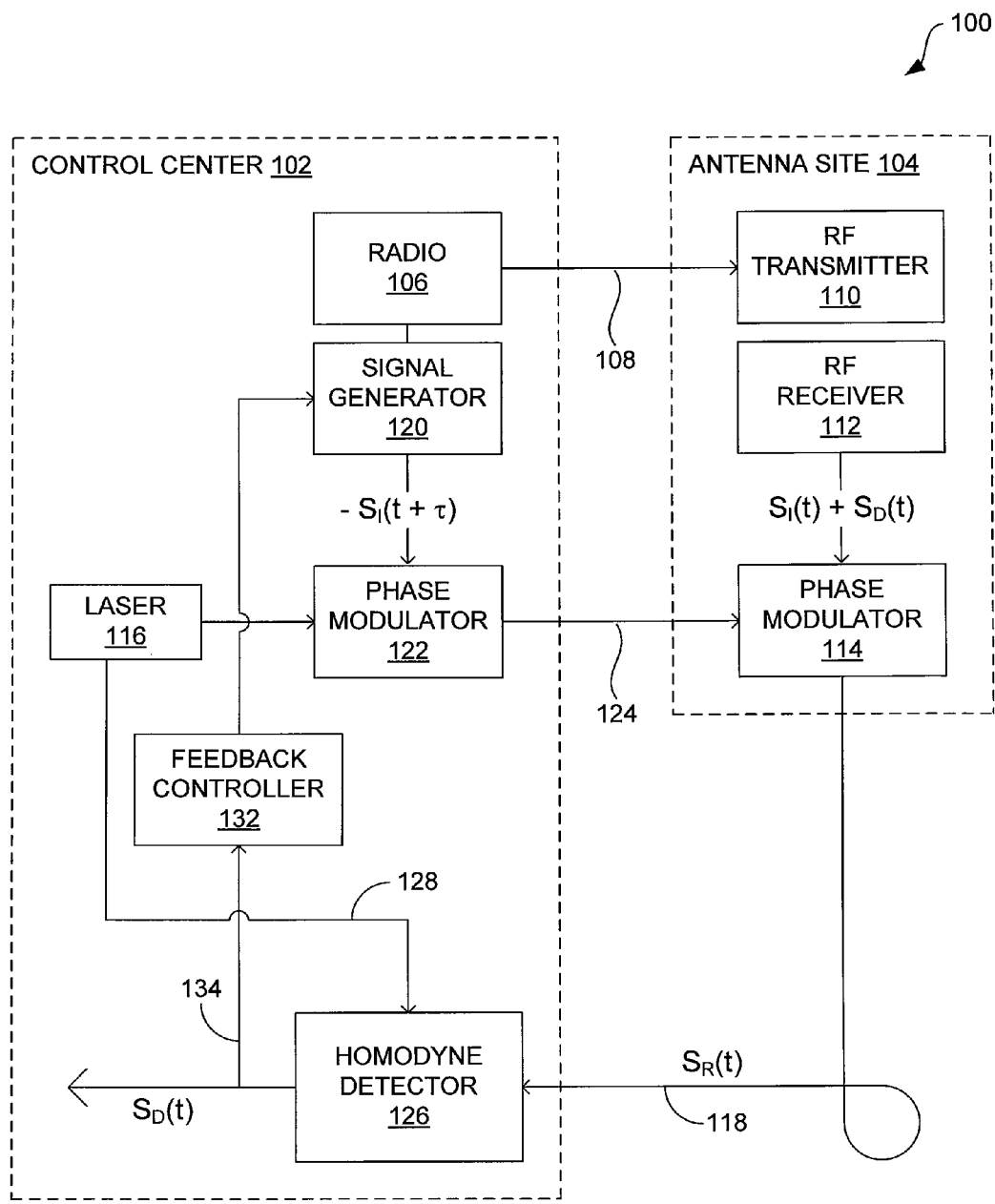
FIG. 2A is a block diagram of a first embodiment of a communication system that uses adaptive interference cancellation.

FIG. 2A illustrates an embodiment of a radio-optical communication system 100 that can, for example, be implemented as part of a JTRS system. The system 100 is generally distributed over two locations: a control center 102 and an antenna site 104. Each of those locations can, for instance, be provided on a particular command aircraft or ship. Located at the control center 102 is a radio 106 at which outgoing RF signals are generated and sent, for example via an electrical cable 108, to an RF transmitter 110 at the antenna site 104 that will transmit the signals to a separate location (e.g., a command center, or another aircraft or ship). In addition to comprising radio transmission electronics, the RF transmitter 110 includes or is at least associated with a transmitting antenna (not shown). In addition to the RF transmitter 110, an RF receiver 112 is provided at the antenna site 104. The RF receiver 112 comprises radio reception electronics and further includes or is associated with a receiving antenna (not shown). The RF receiver 112 is therefore configured to receive RF signals from the separate location.

Further provided at the antenna site 104 is a first phase modulator 114 that is used to modulate a carrier signal generated by a laser 116, which may be located at the control center 102. More particularly, the first phase modulator 114 modulates the optical carrier from the laser 116 in relation to the RF signals received by the RF receiver 112. Because the transmitting and receiving antennas are both located at the antenna site 104, and therefore may be physically proximate to each other, both a desired signal, $S_D$, from the separate location and an interfering signal, $S_I$, from the local transmitting antenna are received by the receiving antenna and, therefore, the RF receiver 112. As a consequence, the RF receiver receives a signal comprising an $S_I$ component and an $S_D$ component. Therefore, both signals are input into the first phase modulator 114, as indicated in FIG. 2A by input $S_I(t)+S_D(t)$, which denote the interfering and desired signals, respectively, as functions of time.

Given that the first phase modulator 114 is driven by the combined interfering and desired signals, both signals are transmitted to the control center 102, for example via a first fiber optic line 118. Because the interfering signal may be significantly stronger than the desired signal, it is possible for the desired signal to become lost in the data transmitted along the optical portion of the communication system. However, because the interfering is generated by the control center 102 (e.g., by radio 106), the interfering signal is known. Therefore, a copy of the interfering signal, is available for use in adaptive cancellation.

Such adaptive cancellation can be achieved using a signal generator 120 and a second phase modulator 122. In particular, the signal generator 120, relative to input received from the radio 106, generates an RF signal, $-S_I$, that is the inverse of the interfering signal. The signal generator 120 can further time adjust $-S_I$ to account for time delays in the transmission of signals between the various components of the control center 102 and those of the antenna site 104. The delay-adjusted signal, $-S_I(t+\tau)$, can be output from the signal generator 120 and used as an input to drive the second phase modulator 122, which can then modulate the optical carrier from the laser 116 and transmit the modulated signal to the first phase modulator 114, for example via a second fiber optic line 124. By way of example, the time delay, $\tau$, can be determined during an initial calibration in which the various time delays are calculated and/or empirically determined.

When the inverse signal received from the second phase modulator 114 is also used by the first phase modulator 114 to modulate the carrier signal from the laser 116, the interfering signal, is adaptively cancelled. In such a case, the control center 102 will receive a resulting optical signal $S_R(t)$, in which the interfering signal, $S_I(t)$, is partially or completely cancelled. By way of example, $S_I(t)$, can be reduced from approximately 20 dBm to approximately −30 dBm, which equates to a five order of magnitude reduction. In the embodiment shown in FIG. 2A, $S_R(t)$ is received by a homodyne detector 126 that outputs the desired RF signal, $S_D(t)$. The optical carrier from the laser 116 is provided to the homodyne detector 126 along line 128 and serves as a local oscillator for the homodyne detector. A phase lock loop (PLL) for feedback control to the local oscillator can be included in the homodyne detector 126 (not shown). The feedback can then be provided from the output of the homodyne detector 126 to a feedback controller 132 for the signal generator 120 along line 134. The error signal for the feedback can be generated by monitoring suppressed interfering signal. The feedback signal can be used for the purpose of fine tuning both the time delay, $\tau$, and power of $-S_I$ that keep the desired suppression of the interfering signal against environmental drifts in the system.

Figure 2B:
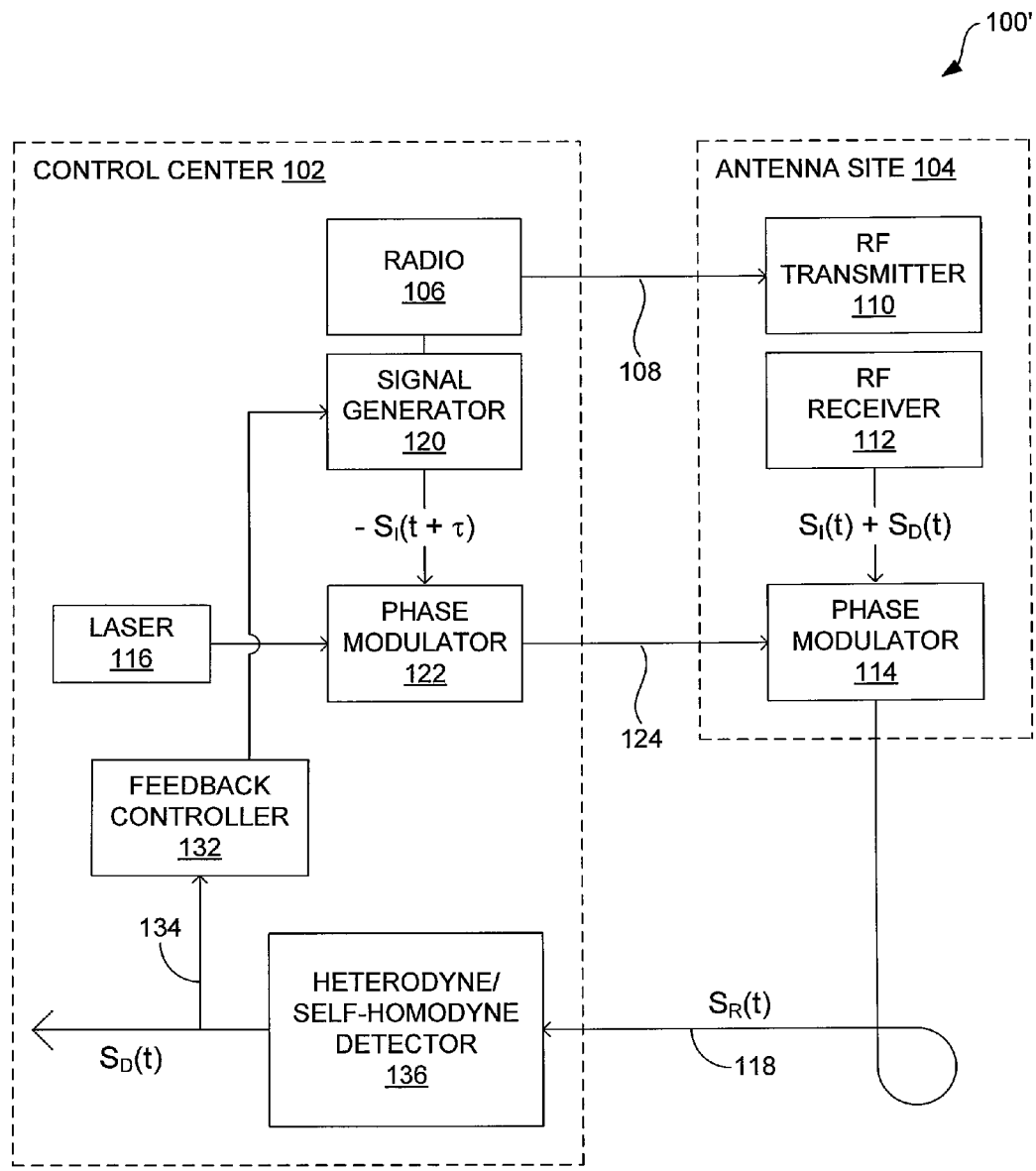
FIG. 2B is a block diagram of a second embodiment of a communication system that uses adaptive interference cancellation.

FIG. 2B illustrates a second embodiment of a radio-optical communication system 100'. The system 100' is similar in several ways to the system 100 described in relation to FIG. 2A and therefore comprises several of the same components, which will not be described again. Unlike the system 100, however, the system 100' uses a heterodyne or a self-homodyne detector 136 to detect the desired signal, $S_D(t)$. In such scenarios, no input from the laser 116 is needed. In the case of heterodyne detector, the signal received from the first phase modulator 114 is interfered with a local oscillator that has an optical carrier signal having a frequency offset from the optical carrier of laser 116. In the case of a self-homodyne detector, the signal received is split and used to beat the homodyne detector with a delayed version of the signal, and detection is achieved without carrier phase recovery. The self-homodyne detector can then detect the signal by measuring the phase difference, which is then integrated to obtain the actual phase.

EXPERIMENTATION

Experiments were performed to confirm the viability of the adaptive cancellation of the type described above. In the experimentation, the parameters and/or conditions contained in Table I were assumed:

TABLE I

| Parameter | Value |
| --- | --- |
| Frequency range ($S_D$ and $S_I$) | 2 MHz to 2000 MHz |
| Optical fiber length | 100 meters delivered |
| | 1000 meters for all requirements |
| RF in and out impedance | 50 ohms nominal |
| Desired signal power for | −114 dBm @ 25 kHz bandwidth |
| $C/N_0$ = dB-Hz | −100 dBm @ 10 MHz bandwidth |
| Interfering signal power | Goal: +20 dBm |
| | Minimum: +10 dBm |
| Input and output RF connectors | SMA, 50 ohms |
| Radio receiver noise figure | 10 dB maximum |

In Table I, the "Frequency range" relates to the frequency range within the electrical domain, the "Optical fiber length" relates to the length of optical fiber(s) that extend(s) between the control center and the antenna site, the "RF in an out impedance" relates to the impedance into the phase modulators and the impedance of the RF output from the detector, the "Desired signal power" relates to the desired power of $S_I$ from the RF receiver for a given carrier-to-noise ratio, the "Interfering signal power" relates to the power of the interfering signal received from the local RF transmitter, and the "Radio receiver noise figure" relates to the total system reduction in signal-to-noise ratio as a result of signal amplification.

Figure 3:
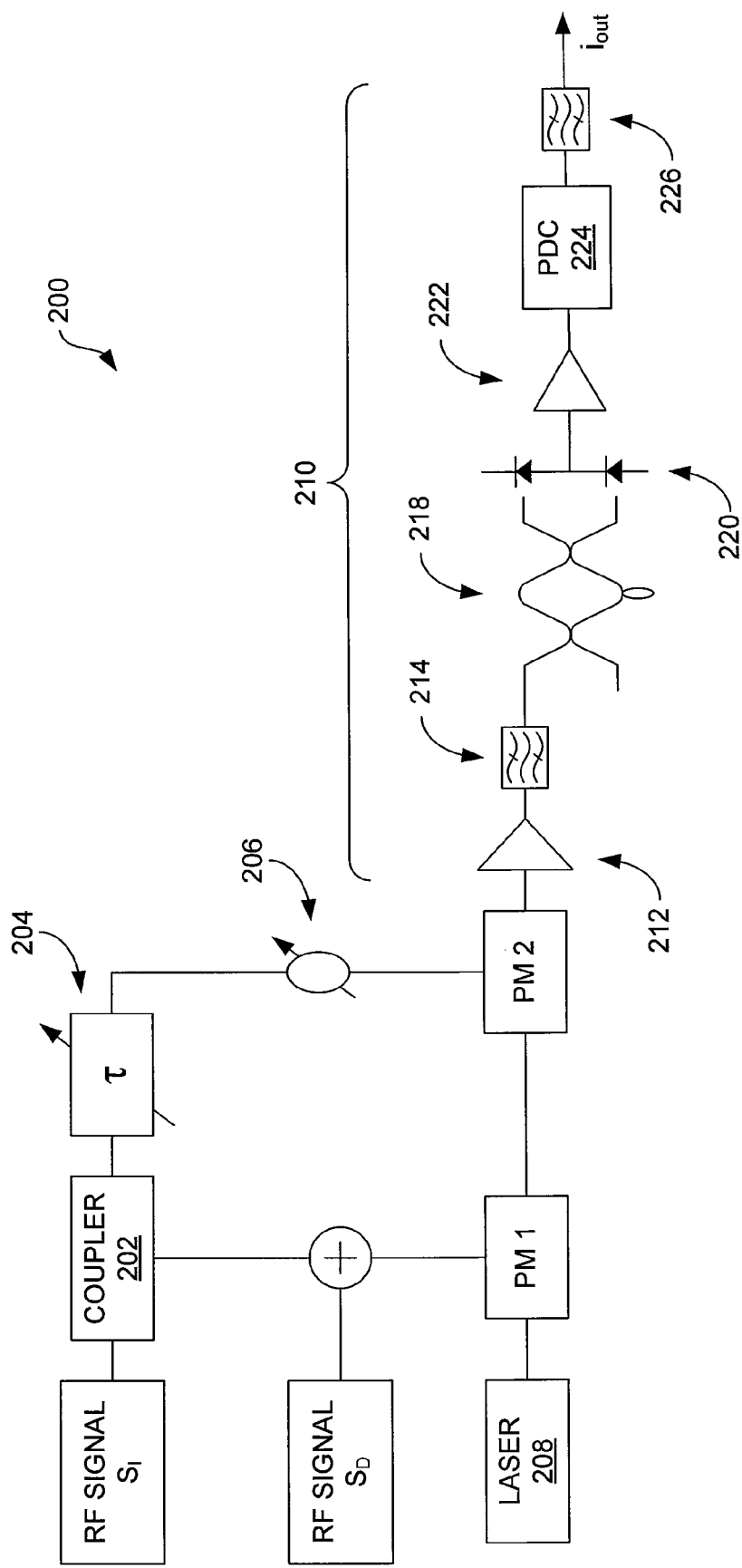
FIG. 3 is a block diagram of a third embodiment of a communication system that uses adaptive interference cancellation.

FIG. 3 illustrates the configuration of a radio-optical communication system 200 that was used to test the disclosed adaptive cancellation. As indicated in FIG. 3, an interference signal, $S_I$, and a desired signal, $S_D$, were separately input into the system 200, and $S_I$ was split by a 180 degree coupler 202 into two parts, one of which was added to $S_D$ and the other of which was delayed by time, $\tau$, by a phase shifter 204 and then attenuated by an attenuator 206. The combined signal ($S_I$+ $S_D$) was input into a first pulse modulator, PM 1, along with a carrier signal from laser 208. The delayed/attenuated signal, $-S_I$, was input into a second pulse modulator, PM 2.

The output signal of the second pulse modulator was then output to a self-homodyne detection system 210. In the illustrated embodiment, that output signal was amplified by an optical amplifier 212 and filtered by an optical filter 214. Next, the signal was detected using a delayed interferometer 218, which performs self-homodyne detection in conjunction with balanced photodetectors 220, which improve efficiency of detection and reduce noise. Next, the detected signal was amplified with an amplifier 222 and detected by a phase detection circuit 224. Finally, the signal was filtered by a further filter 226 to remove the RF carrier and output the desired information, $i_{out}$.

Figure 4:
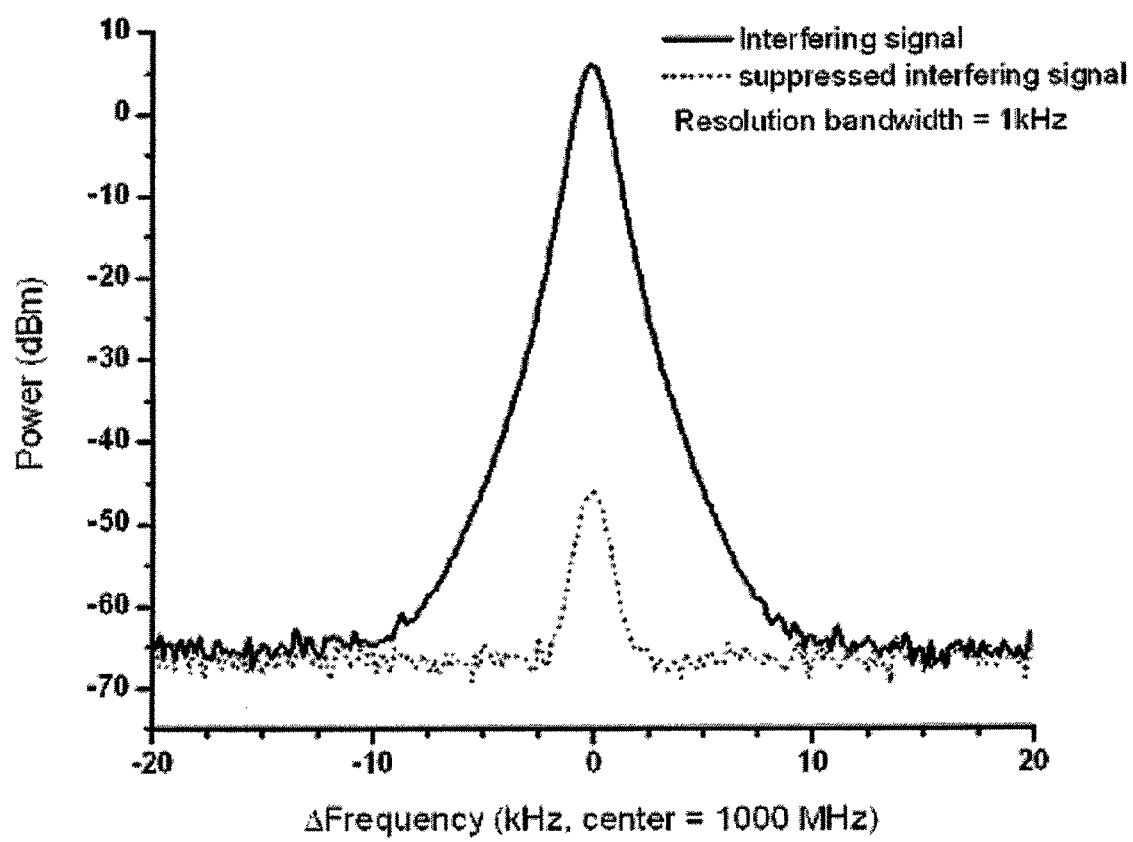
FIG. 4 is a graph that illustrates interference cancellation achieved using the system of FIG. 3.

FIG. 4 shows the spectra of the interference signal used in the system of FIG. 3. In particular, FIG. 4 shows the interference signal, before ("Interfering signal") and after ("suppressed interfering signal") adaptive cancellation was performed. As is apparent from the plots of FIG. 4, significant interference cancellation was achieved using the system of FIG. 3. At the optimum parameters of delay and attenuation of the $S_I$, the cancellation is nearly complete and the interference signal actually reduces to below the noise floor of the spectrum analyzer. Because of the stability of the variable attenuator, the effect of cancellation tends to drift. However, once optimized, interference cancellation is at least 50 dB, as shown in FIG. 4.

It is noted that the above-described adaptive cancellation is viable given that phase modulation is substantially linear and therefore does not produce the non-linearity that would result in mixing (i.e., multiplication) of the signals. With a linear system, simple addition and cancellation of the interfering signal, $S_I(t)$, and the inverse signal, $-S_I(t)$, yields high levels of signal cancellation.

The invention claimed is:

1. A communications method comprising:
   receiving a radio frequency (RF) signal comprising a desired signal component and an interference signal component;
   generating an inverse interference signal;
   inputting the inverse interference signal into a first optical phase modulator;
   modulating a carrier signal with the first optical phase modulator relative to the inverse interference signal to generate a modulated optical signal;
   transmitting the modulated optical signal to a second optical phase modulator;
   modulating the carrier signal with the second optical phase modulator relative to the received RF signal and the modulated optical signal from the first optical phase modulator to generate a resulting optical signal;
   transmitting the resulting optical signal to a detector; and
   detecting the desired signal component with the detector.

2. The method of claim 1, wherein RF signal is received by an RF receiver and wherein the RF receiver and the second optical phase modulator are located at an antenna site.

3. The method of claim 2, wherein generating an inverse interference signal comprises generating an inverse interference signal with a signal generator located at a control center separate from the antenna site.

4. The method of claim 3, wherein the first optical phase modulator is located at the control center.

5. The method of claim 4, wherein transmitting the modulated optical signal comprises transmitting the modulated optical signal via a fiber optic line.

6. The method of claim 1, wherein transmitting the resulting optical signal comprises transmitting the resulting optical signal via a fiber optic line.

7. The method of claim 1, wherein detecting the desired signal comprises detecting the desired signal with a homodyne detector.

8. The method of claim 1, wherein detecting the desired comprises detecting the desired signal with a heterodyne detector.

9. The method of claim 1, wherein detecting the desired signal comprises detecting the desired signal with a self-homodyne detector.

10. The method of claim 1, wherein generating an inverse interference signal comprises time shifting the interference signal component to account for system time delay.

11. The method of claim 10, further comprising providing feedback from the detector to adjust the time delay.

12. The method of claim 1, further comprising providing feedback from the detector to a feedback controller that controls a laser that generates the carrier signal.

13. A method for cancelling interference in a communications system, the method comprising:
    receiving a radio frequency (RF) signal with an RF receiver located at an antenna site, the signal comprising a desired signal component and an interference signal component, the interference signal component originating from an RF transmitter also located at the antenna site;
    inputting the received RF signal from the RF receiver into a first phase modulator located at the antenna site;
    generating with a signal generator an inverse RF interference signal that is the inverse of the interference signal component;
    inputting the inverse interference RF signal into a second phase modulator;
    modulating an optical carrier signal with the second phase modulator relative to the inverse RF interference signal to generate a modulated optical signal;
    transmitting the modulated optical signal from the second phase modulator to the first phase modulator;
    modulating the optical carrier signal with the first phase modulator relative to the received RF signal and the modulated optical signal to generate a resulting optical signal;
    transmitting the resulting optical signal from the first phase modulator to a detector; and
    detecting the desired signal component with the detector.

14. The method of claim 13, wherein detecting the desired signal component comprises detecting the desired signal with a homodyne detector.

15. The method of claim 13, wherein detecting the desired signal component comprises detecting the desired signal with a heterodyne detector.

16. The method of claim 13, wherein detecting the desired signal component comprises detecting the desired signal with a self-homodyne detector.

17. The method of claim 13, wherein generating an inverse RF interference signal comprises time shifting the inverse RF interference signal to account for communications system time delay.

18. The method of claim 17, further comprising providing feedback from the detector to a signal generator that generates the inverse RF interference signal, wherein the feedback is used by the signal generator to adjust the time delay.

19. The method of claim 13, further comprising providing feedback from the detector to a feedback controller that controls a laser that generates the carrier signal.

20. A communications system comprising:
    an RF receiver that receives a desired signal and an interference signal;
    a first phase modulator that receives the desired signal and the interference signal from the RF receiver and that generates a resulting optical signal;
    a second phase modulator that generates a modulated optical signal relative to an inverse interference signal and that transmits the modulated optical signal to the first phase modulator; and
    a detector that receives the resulting optical signal from the first phase modulator and detects the desired signal, wherein the resulting optical signal comprises a modulated optical signal generated by the first phase modulator relative to the desired signal and the interference signal received from the RF receiver and further relative to the modulated optical signal received from the second phase modulator.

21. The system of claim 20, wherein the RF receiver and the first phase modulator are located at an antenna site.

22. The system of claim 21, further comprising a signal generator that generates the inverse interference signal, wherein the signal generator and the second phase modulator are located at a control center that is physically separate from the antenna site.

23. The system of claim 22, wherein the antenna site and the control center are each located on an aircraft or on a ship.

24. The system of claim 20, wherein the detector comprises a homodyne detector.

25. The system of claim 20, wherein the detector comprises a heterodyne detector.

26. The system of claim 20, wherein the detector comprises a self-homodyne detector.

27. A radio-optical communications system that incorporates adaptive interference cancellation, the system comprising:

an antenna site including:
- a radio frequency (RF) transmitter that transmits an interference signal,
- an RF receiver that receives a desired signal and the interference signal transmitted by the RF transmitter, and
- a first phase modulator that receives the desired signal and the interference signal from the RF receiver and that generates a resulting optical signal; and a control center including:
- a signal generator that generates an inverse interference signal that is the inverse of the interference signal transmitted by the RF transmitter,
- a second phase modulator that receives the inverse interference signal from the signal generator, generates a modulated optical signal relative to the inverse interference signal, and transmits the modulated optical signal to the first phase modulator, and
- a detector that receives the resulting optical signal from the first phase modulator and detects the desired signal, wherein the resulting optical signal comprises a modulated optical signal generated by the first phase modulator relative to the desired signal and the interference signal received from the RF receiver and further relative to the modulated optical signal received from the second phase modulator.

28. The system of claim 27, wherein the detector comprises a homodyne detector.

29. The system of claim 27, wherein the detector comprises a heterodyne detector.

30. The system of claim 27, wherein the detector comprises a self-homodyne detector.

* * * * *